United States Patent
Forghani (10) Patent No.: US 10,942,717 B2
(45) Date of Patent: *Mar. 9, 2021

(54) GENERATING CLOSURES FROM ABSTRACT REPRESENTATION OF SOURCE CODE

(71) Applicant: Capital One Services, LLC, McLean, VA (US)

(72) Inventor: Behdad Forghani, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/570,335

(22) Filed: Sep. 13, 2019

(65) Prior Publication Data
US 2020/0004513 A1   Jan. 2, 2020

Related U.S. Application Data

(63) Continuation of application No. 15/923,226, filed on Mar. 16, 2018, now Pat. No. 10,416,972.

(51) Int. Cl.
*G06F 8/41* (2018.01)
*G06F 8/30* (2018.01)
*G06F 40/154* (2020.01)

(52) U.S. Cl.
CPC ............... *G06F 8/427* (2013.01); *G06F 8/41* (2013.01); *G06F 8/37* (2013.01); *G06F 8/42* (2013.01); *G06F 8/425* (2013.01); *G06F 8/436* (2013.01); *G06F 8/443* (2013.01); *G06F 40/154* (2020.01)

(58) Field of Classification Search
CPC .................................. G06F 8/41; G06F 8/427
See application file for complete search history.

(56) References Cited

U.S. PATENT DOCUMENTS

| | | | |
|---|---|---|---|
| 10,416,972 B1 | 9/2019 | Forghani | |
| 2007/0169027 A1 | 7/2007 | Drepper et al. | |
| 2009/0064091 A1 | 3/2009 | Tonkin et al. | |
| 2011/0239186 A1 | 9/2011 | Zinkovsky et al. | |
| 2012/0210308 A1* | 8/2012 | Goetz | G06F 9/4484 717/140 |
| 2015/0194223 A1 | 7/2015 | Cui et al. | |
| 2015/0347269 A1 | 12/2015 | Nelson et al. | |
| 2016/0147511 A1 | 5/2016 | Eble et al. | |

OTHER PUBLICATIONS

Shaul Dar and Rakesh Agrawal, Extending SQL with Generalized Transitive Closure, IEEE, 1993, retrieved online on Oct. 23, 2020, pp. 799-812. Retrieved from the Internet: <URL: https://ieeexplore.ieee.org/stamp/stamp.jsp?tp=&arnumber=243510>. (Year: 1993).*
Pieterse V., et al., "Benchmarking Optimised Algorithms for Transitive Closure," ACM, 2017, pp. 1-10. [retrieved on Jun. 27, 2019] Retrieved from the Internet: [URL:http://delivery.acm.org/10.1145/3130000/3129425/a27-pieterse.pdf?].

* cited by examiner

*Primary Examiner* — Hanh Thi-Minh Bui
(74) *Attorney, Agent, or Firm* — Harrity & Harrity, LLP (57) ABSTRACT

A device may receive source code and identify, based on the source code, an abstract syntax tree representing an abstract syntactic structure of the source code. Based on the abstract syntax tree, the device may identify a closure, the closure implementing a function based on at least a portion of the abstract syntax tree. In addition, the device may perform an action based on the closure.

20 Claims, 5 Drawing Sheets

GENERATING CLOSURES FROM ABSTRACT REPRESENTATION OF SOURCE CODE

RELATED APPLICATION

This application is a continuation of U.S. patent application Ser. No. 15/923,226, filed Mar. 16, 2018 (now U.S. Pat. No. 10,416,972), the contents of which are herein incorporated by reference in its entirety.

BACKGROUND

A compiler is computer software that transforms computer code written in one programming language (e.g., a software program containing source code) into another programming language (e.g., a machine language program containing machine code). An interpreter is a computer program that directly executes instructions written in a programming or scripting language (e.g., source code), without requiring the instructions to have been previously compiled into a machine language program.

SUMMARY

According to some implementations, a device may comprise: one or more memories; and one or more processors, communicatively coupled to the one or more memories, to: receive source code; identify, based on the source code, an abstract syntax tree, the abstract syntax tree representing an abstract syntactic structure of the source code; identify, based on the abstract syntax tree, a closure, the closure implementing a function based on at least a portion of the abstract syntax tree; and perform an action based on the closure.

According to some implementations, a non-transitory computer-readable medium may store instructions, the instructions comprising: one or more instructions that, when executed by one or more processors, cause the one or more processors to: receive source code; identify, based on the source code, an abstract syntax tree, the abstract syntax tree representing an abstract syntactic structure of the source code; identify, based on the abstract syntax tree, a plurality of closures, each closure, of the plurality of closures, specifying a respective function based on at least a portion of the abstract syntax tree; and perform an action based on the plurality of closures.

A method may comprise: receiving, by a device, source code; identifying, by the device and based on the source code, an abstract representation of the source code; identifying, by the device and based on the abstract representation, a closure, the closure specifying a function based on the abstract representation; and providing, by the device, the closure to permit the closure to be executed without compiling the closure.

DETAILED DESCRIPTION

The following detailed description of example implementations refers to the accompanying drawings. The same reference numbers in different drawings may identify the same or similar elements.

Generally, when a computing device executes instructions included in source code, the instructions are either interpreted by the computing device (e.g., for interpreted languages), or the instructions are first compiled into executable machine code (e.g., for compiled languages), which is often included in a file (such as a binary file, executable file, and/or the like) before execution. Execution of compiled code is often faster than execution of interpreted code, for example, due to compiled code being in machine language and not requiring interpretation during execution. However, compiling code takes time and uses processing resources up front to compile and also results in the creation of a separate file (e.g., an executable file), which consumes storage resources. In addition, in a large scale computing environment, developers may frequently prepare and deploy many applications, services, and/or the like, and each deployment may require the creation of new executable files which may need to be deployed on many computing devices (e.g., in a cloud computing infrastructure). This approach may consume significant computing resources to enable compilation and deployment of applications and services at scale.

Some implementations, described herein, include a code generation platform that uses an abstract representation (e.g., an abstract syntax tree (AST)) of source code to generate precompiled closures, effectively rewriting the original source code into executable closures that do not require an intermediary file and, when executed, do not require an interpreter to traverse the abstract representation. For example, the code generation platform may receive source code and identify an AST (e.g., a tree representation of the abstract syntactic structure of source code) that represents the source code. Using the AST, the code generation platform may generate closures (e.g., records storing a function together with an environment in which the function was declared, which can include any local variables that were in-scope when the closure was created, and which returns a function) for executable statements included in the source code (e.g., executable statements that would require an interpreter to traverse the AST during execution). Using the closures, which are in precompiled form, the code generation platform may generate executable code that includes the closures, and execute the closures (e.g., enabling the code generation platform to execute the executable code by executing the precompiled closures, obviating the need to traverse an AST for the executable statements).

By generating executable code (e.g., precompiled closures) that does not require traversal of an AST, the code generation platform may provide executable code that can be executed much faster than traditional interpreted code (e.g., because traversal of an AST is not required). In addition, the executable code may be generated in a way that does not require compilation of the executable code into a separate intermediary or binary file (e.g., instead, storing the executable closures in memory of the device to execute the closures), obviating the need to store any intermediary files by the device(s) executing the executable code. Due to the foregoing, execution of source code by converting source code into executable code that includes closures may be more efficient than traditional code execution methods, conserving computing resources such as processing resources, storage resources, and/or the like. For example, in a cloud computing environment where developers are responsible for distributing and maintaining copies of software on multiple machines, the ability to execute code without storing an intermediary file may conserve significant development and storage resources. In addition, the code generation platform may be able to produce executable code that is in the same programming language as the source code or is in a different programming language from the source code, which may enable the operations specified by a wide variety of source code to be executed by computing devices that may only support certain programming languages. When implemented on a large scale, such as in an implementation where computing devices are used to execute many hundreds, thousands, millions, etc. of instructions, the use of the code generation platform may conserve a significant amount of computing resources.

Figure 1:
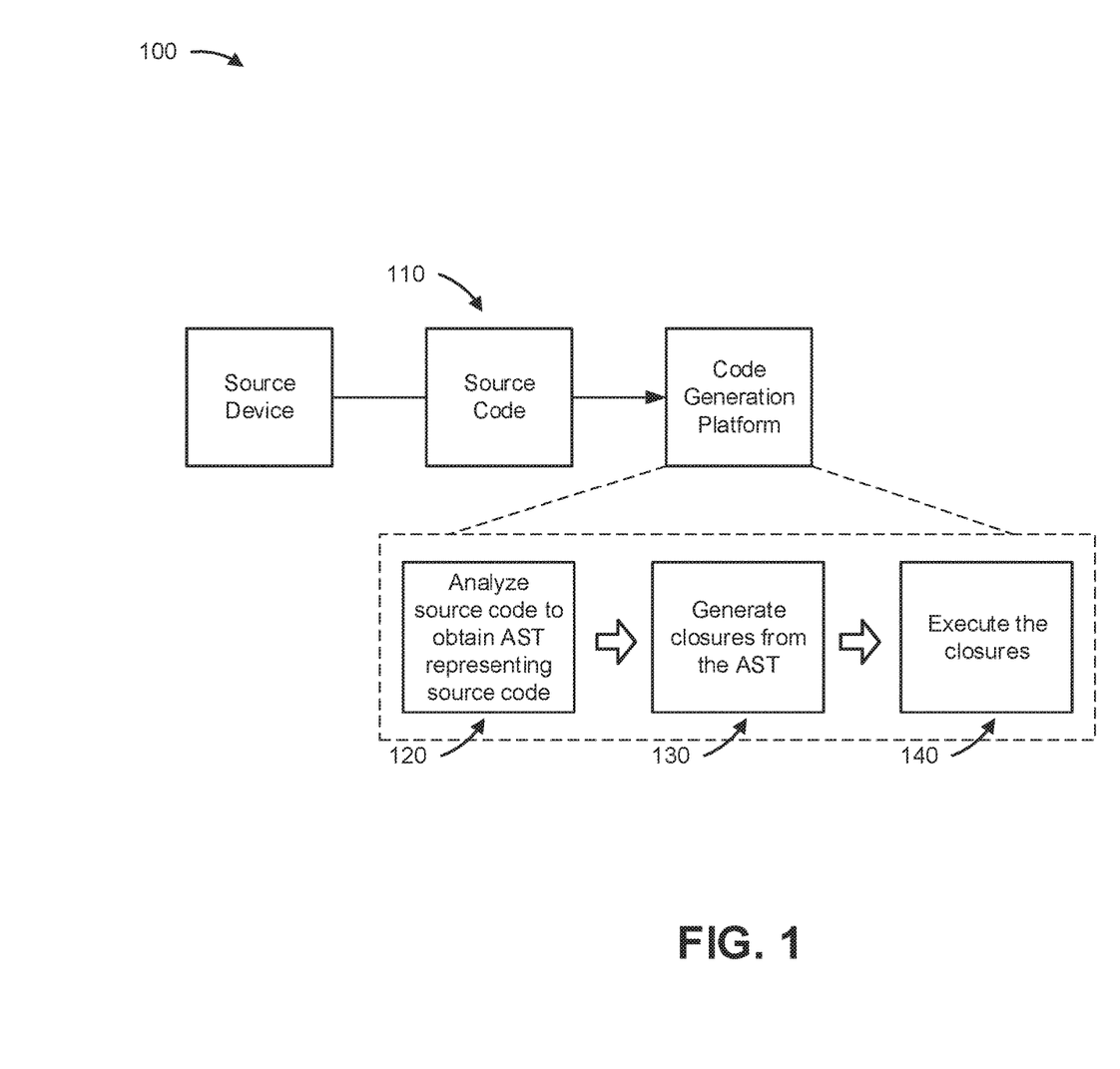
FIG. 1 is a diagram of an overview of an example implementation described herein.

FIG. 1 is a diagram of an overview of an example implementation 100 described herein. As shown in FIG. 1, example implementation 100 includes a source device (e.g., a computing device, such as a personal computer, server computer, tablet computer, and/or the like) that provides source code to a code generation platform (e.g., one or more computing devices), for execution of the source code by the code generation platform.

As shown in FIG. 1, and by reference number 110, the code generation platform receives source code from the source device. The source code may be in any computer programming language. The source code may be, for example, Structured Query Language (SQL) code, JavaScript code, Python code, Ruby code, Lua code, and/or the like. In various implementations, the source code may be in any appropriate form, such as a file, a script, a data stream, and/or the like. The source code may be obtained in a variety of ways, for example, the source code could be provided by the source device based on user input and/or output from a program operating on the source device, the source code could be obtained by the code generation platform from a server or a web site, and/or the like.

As further shown in FIG. 1, and by reference number 120, the code generation platform identifies the abstract syntactic structure of the source code by analyzing the source code to obtain an AST. For example, the code generation platform may analyze the source code, or may have a separate device analyze the source code, to identify abstract syntactic elements of the source code, such as statements, conditions, variables, constants, and/or the like. The abstract syntactical structure of the source code may be represented in an AST, which is a tree representation of the abstract syntactic structure of source code. For example, in the AST, each node of the tree may denote a construct (e.g., variable, conditional statement, operand, constant, and/or the like) occurring in the source code. The AST may be the same tree that an interpreter would traverse when interpreting the source code.

As further shown in FIG. 1, and by reference number 130, the code generation platform generates one or more closures from the AST. A closure is type of function that allows binding the source code to variables or function parameters that can be used at a later function call. The closure may be implemented as a record storing a function together with an environment, and provides a mapping associating each free variable of the function (e.g., a captured variable that is used locally, but defined in an enclosing scope) with the value or reference to which the variable was bound when the closure was created. Unlike a typical function, a closure allows the associated function to access those captured variables through the closure's copies of their values or references, even when the function is invoked outside the scope of those variables. In addition, the closures created from the AST may be precompiled, e.g., the closures may have been previously defined in precompiled and executable form for each possible construct in the AST, enabling a computing device to execute the closure(s) and to execute the closures without traversing an AST. The code generation platform may generate one or more closures for every executable statement represented in the AST. As noted above, the closures generated by the code generation platform are pre-compiled (e.g., in a state ready for execution) and may be stored, for example, in memory of the code generation platform, enabling the code generation platform to execute the closures without needing further compilation and/or the creation of an intermediary or executable file. In some implementations, the executable code (e.g., the closures) may be in the same language as the source code or a different language from the source code.

As further shown in FIG. 1, and by reference number 140, the code generation platform executes the closures. Because the closures are pre-compiled when generated by the code generation platform, the execution of the closures may be performed in a way that the code generation platform does not need to compile the closures or traverse an AST during execution (e.g., as the code generation platform might need to do if the code generation platform were to execute the source code directly, rather than the closures).

By generating executable code (e.g., precompiled closures) that does not require traversal of an AST, the code generation platform may provide executable code that can be executed much faster than traditional interpreted code (e.g., because traversal of an AST is not required). In addition, the executable code may be generated in a way that does not require compilation of the executable code into a separate intermediary or binary file (e.g., instead, storing the executable closures in memory of the device to execute the closures), obviating the need to store any intermediary files by the device(s) executing the executable code. Due to the foregoing, execution of source code by converting source code into executable code that includes closures may be more efficient than traditional code execution methods, conserving computing resources, such as processing resources, storage resources, and/or the like. In addition, the code generation platform may be able to produce executable code that is in the same programming language as the source code or is in a different programming language from the source code, which may enable the operations specified by a wide variety of source code to be executed by computing devices that may only support certain programming languages. When implemented on a large scale, such as in an implementation where computing devices are used to execute many hundreds, thousands, millions, etc. of instructions, the use of the code generation platform may conserve a significant amount of computing resources.

As indicated above, FIG. 1 is provided merely as an example. Other examples are possible and may differ from what was described with regard to FIG. 1.

Figure 2:
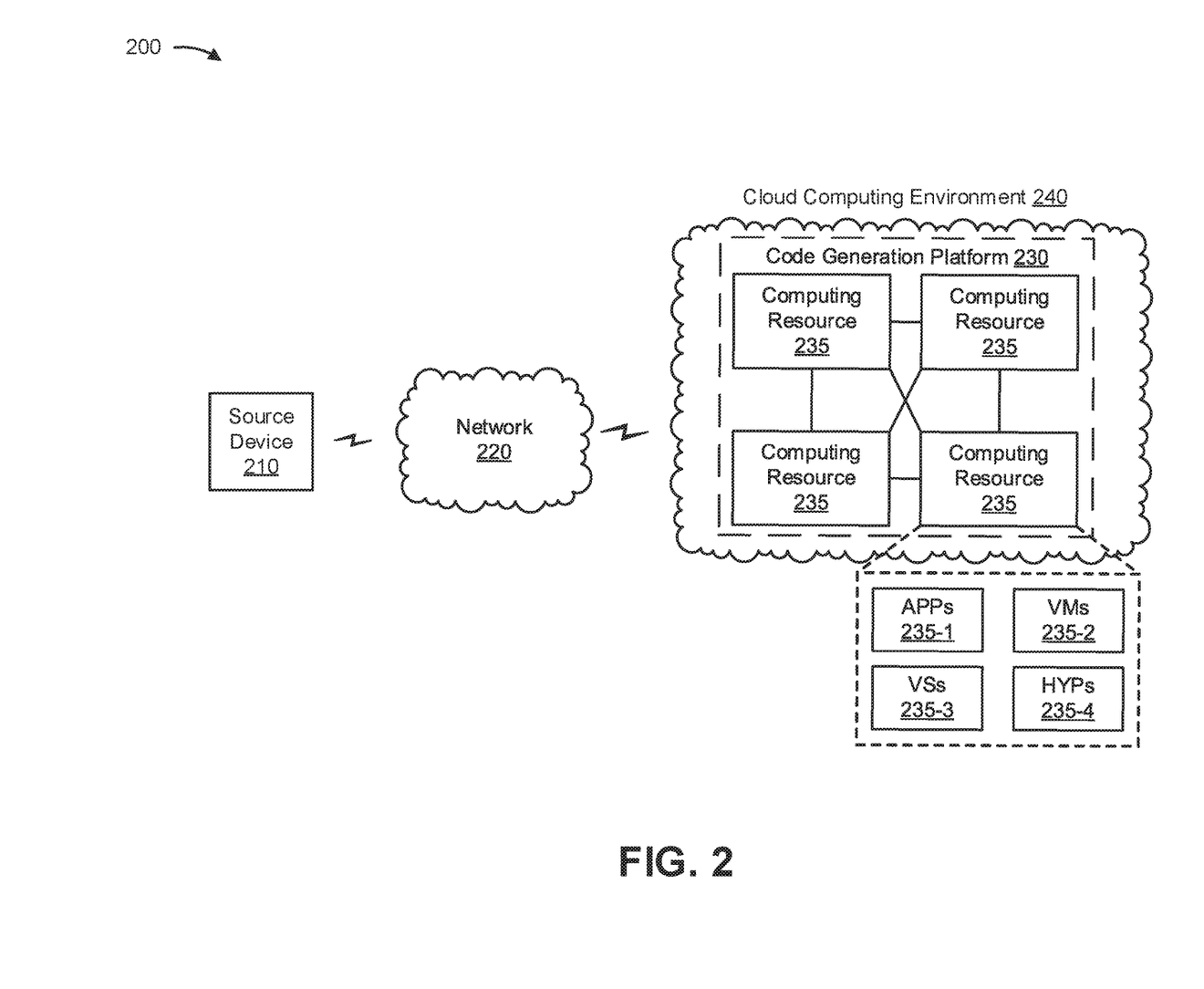
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a source device 210, a network 220, a code generation platform 230, a computing resource 235, and a cloud computing environment 240. Devices of environment 200 may interconnect via wired connections, wireless connections, or a combination of wired and wireless connections.

Source device 210 includes one or more devices capable of receiving, generating, storing, processing, and/or providing information associated with source code. For example, source device 210 may include a device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a server device, a group of server devices, a cloud computing device, a data center device, or a similar type of device. Source device 210 may include one or more applications designed to enable source device 210 to provide source code to code generation platform 230, e.g., via network 220.

Network 220 includes one or more wired and/or wireless networks. For example, network 220 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Code generation platform 230 includes one or more devices capable of receiving, generating, storing, processing, and/or providing information associated with source code. For example, code generation platform 230 may include a server device (e.g., a host server, a web server, an application server, etc.), a data center device, or a similar device. Code generation platform 230 is capable of generating closures to represent source code received from source device 210, and executing the closures to perform one or more actions specified by the closures. Code generation platform 230 may, in some implementations, include or otherwise have access to other resources to facilitate performing one or more of the operations described above, including resources for identifying an abstract representation of source code, resources for identifying a closure based on an abstract representation of source code, resources for executing closures, and/or the like. Code generation platform 230 may, in some implementations, include or otherwise have access to a data storage device that may be used to store data in a manner designed to facilitate performing one or more of the operations described above, including storing predefined closures, storing template closures, and/or the like.

In some implementations, code generation platform 230 may include one or more devices that operate micro-services that include logic for generating and/or executing closures based on received input. For example, code generation platform 230 may receive source code for a program via a web page, and a micro-service operating on code generation platform 230 may generate and execute closures based on the received source code.

In some implementations, as shown, code generation platform 230 may be hosted in cloud computing environment 240. Notably, while implementations described herein describe code generation platform 230 as being hosted in cloud computing environment 240, in some implementations, code generation platform 230 might not be cloud-based (i.e., may be implemented outside of a cloud computing environment) or might be partially cloud-based.

Cloud computing environment 240 includes an environment that delivers computing as a service, whereby shared resources, services, etc. may be provided to generate closures from abstract representations of source code. Cloud computing environment 240 may provide computation, software, data access, storage, and/or other services that do not require end-user knowledge of a physical location and configuration of a system and/or a device that delivers the services.

Computing resource 235 includes one or more personal computers, workstation computers, server devices, or another type of computation and/or communication device. In some implementations, computing resource 235 may host code generation platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 includes one or more software applications that may be provided to or accessed by source device 210. Application 235-1 may eliminate a need to install and execute the software applications on source device 210. For example, application 235-1 may include software associated with code generation platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., source device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
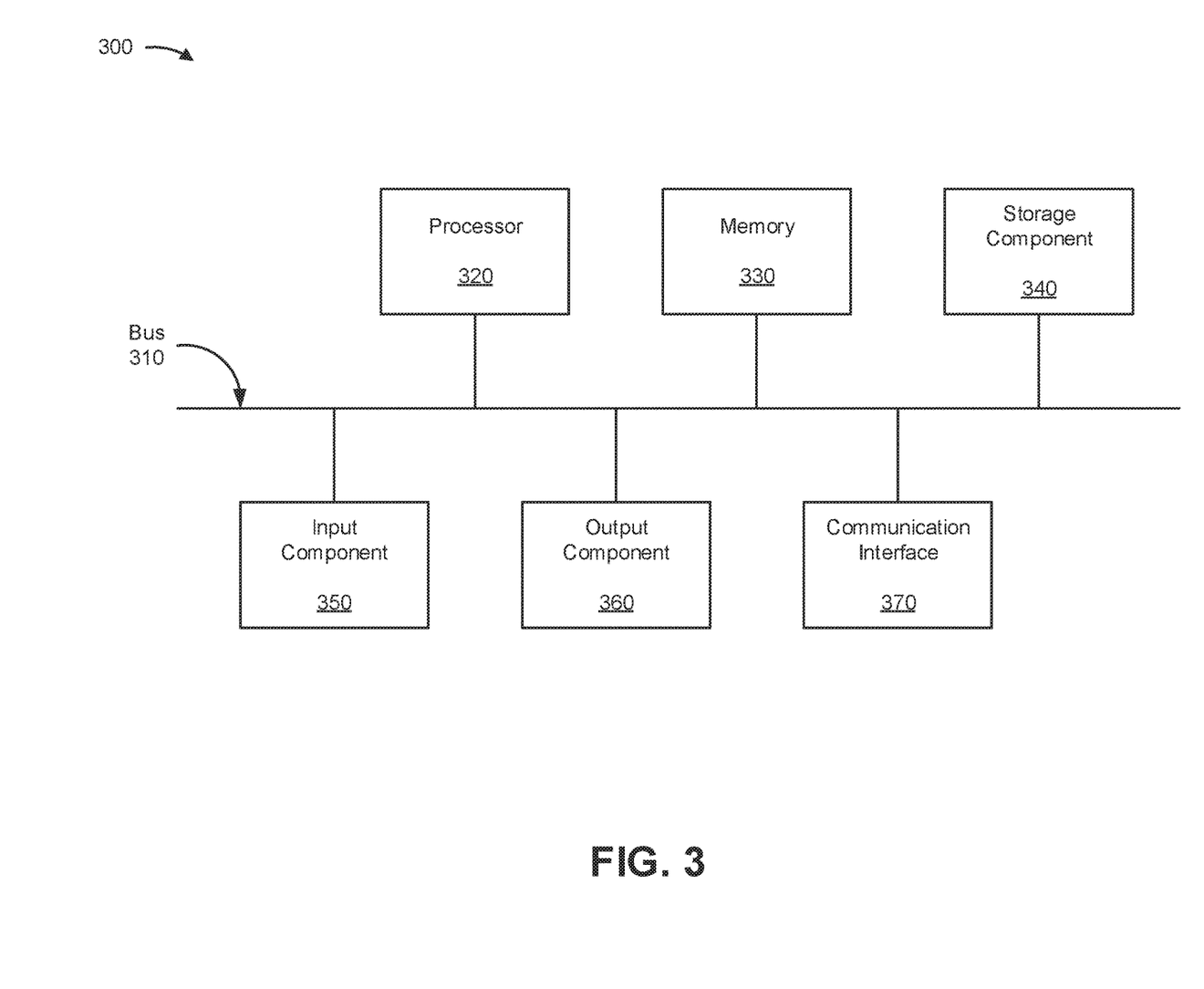
FIG. 3 is a diagram of example components of one or more devices of FIG. 2.

FIG. 3 is a diagram of example components of a device 300. Device 300 may correspond to source device 210 and/or computing resource 235. In some implementations, source device 210 and/or computing resource 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
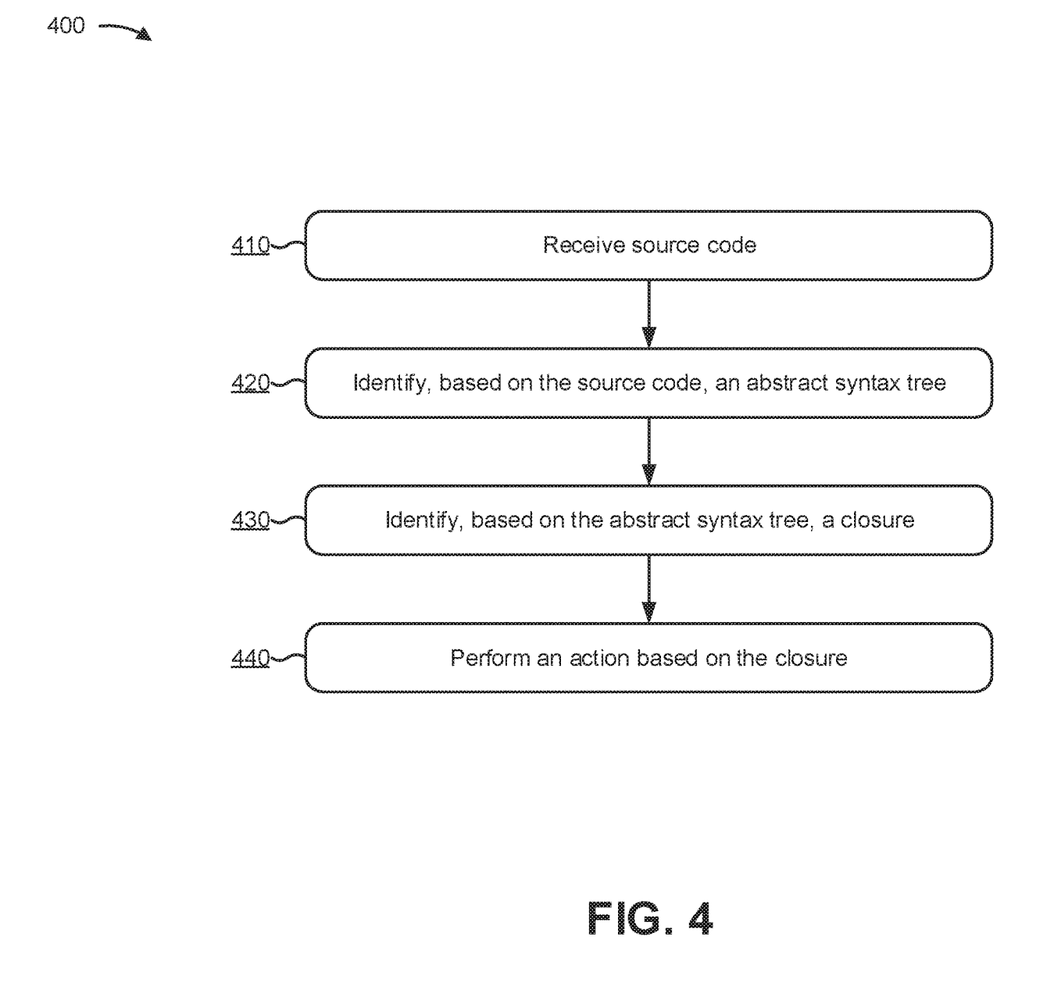
FIG. 4 is a flow chart of an example process for generating closures from abstract representations of source code.

FIG. 4 is a flow chart of an example process 400 for generating closures from abstract representations of source code. In some implementations, one or more process blocks of FIG. 4 may be performed by code generation platform 230. In some implementations, one or more process blocks of FIG. 4 may be performed by another device or a group of devices separate from or including code generation platform 230, such as source device 210.

As shown in FIG. 4, process 400 may include receiving source code (block 410). For example, code generation platform 230 may receive (e.g., using computing resource 235, processor 320, input component 350, communication interface 370, and/or the like) the source code from source device 210. The source code may be received in any appropriate format (e.g., an input stream, a file, a reference to a server, database, or website that stores the code, and/or the like), and in any programming language (e.g., SQL, JavaScript, Java, C, C++, C#, Python, Ruby, Lua, and/or the like).

By way of example, code generation platform 230 may be associated with an interface for receiving source code (e.g., a web interface, console interface, and/or the like) from source device 210. Source device 210 may provide code generation platform 230 with source code in a manner designed to enable code generation platform 230 to perform operations specified by the source code. In some implementations, code generation platform 230 may be designed to receive many pieces of source code from many different source devices 210. For example, where code generation platform 230 is implemented to handle many pieces of source code at once, the pieces of source code may be received by one or more computing resources 235 associated with cloud computing environment 240.

In some implementations, code generation platform 230 may receive the source code from user input (e.g., through a peripheral device, source device 210, and/or the like). For example, code generation platform 230 may include an interface for receiving user input that includes source code. As with source code provided by source device 210, a user may provide source code in a manner designed to enable code generation platform 230 to perform one or more operations specified in the source code (e.g., by generating and executing closures that are based on the source code). In some implementations, code generation platform 230 may receive the source code from a database, e.g., based on receiving a reference to the source code (e.g., via a web interface), code generation platform 230 may retrieve source code from a database using the reference.

In this way, code generation platform 230 may receive the source code, enabling code generation platform 230 to identify an abstract representation of the source code. The abstract representation, such as an AST, may further enable code generation platform 230 to identify and execute closures in a manner designed to perform operations specified by the source code.

As further shown in FIG. 4, process 400 may include identifying, based on the source code, an abstract syntax tree (block 420). For example, code generation platform 230 may identify (e.g., using computing resource 235, processor 320, and/or the like) the AST based on the source code received from source device 210. The AST is a tree representation of the abstract syntactic structure of the source code received from source device 210. In some implementations, code generation platform 230 may identify an abstract representation of the source code in a form other than an AST, such as a parse tree, syntax tree, abstract semantic graph, and/or the like.

In some implementations, code generation platform 230 may identify the AST by analyzing the source code. For example, code generation platform 230 may review and identify all statements and/or constructs in the source code and build an AST based on the identified statements and/or constructs, e.g., using a parser (a software component designed to take source code as input and produce a data structure, such as an AST, as output). By way of example, parsing the source code using a parser may generate data structures used to represent the logic of the source code in a tree form (e.g., including multiple nodes and branches representing the logic of the source code).

In this way, code generation platform 230 may identify, based on the source code, an AST, enabling code generation platform 230 to identify one or more closures based on the AST. The closures identified by code generation platform 230 may be designed to be executed by code generation platform, e.g., to cause code generation platform 230 to perform the operations specified by the source code.

As further shown in FIG. 4, process 400 may include identifying, based on the abstract syntax tree, a closure (block 430). For example, code generation platform 230 may identify (e.g., using computing resource 235, processor 320, and/or the like) one or more closures based on the AST that code generation platform 230 identified based on the source code received from source device 210. In some implementations, code generation platform 230 may identify the closure by generating the closure. In some implementations, as described herein, code generation platform 230 may identify multiple closures for the AST. In some implementations, code generation platform 230 may identify numerous closures based on numerous ASTs (e.g., in a situation where code generation platform 230 in cloud computing environment 240 receives multiple pieces of source code specifying multiple operations to be performed by code generation platform 230).

In some implementations, code generation platform 230 generates the closure by using predefined portions of precompiled code to represent the various expressions and/or constructs that might be encountered in the AST. For example, the closure may be generated by matching an expression included in the AST to predefined and precompiled closure code, creating a function that returns a function, where the operation performed by the returned function (and the variables/constants used), may depend on the expression in the AST. By way of example, consider the SQL statement "SELECT a+1 as b FROM table." The foregoing statement includes the expression, "a+1," the AST for which would include a parent node with the operand "+," a first child node with the variable "a," and a second child node with the constant "1." A closure may be generated for the expression, "a+1," e.g., by parsing the statement to identify the operand and using the variable and constant in a precompiled closure that was previously defined for use with expressions that include the addition operand (e.g., "+").

By way of example, consider the following code, generated based on SQL source code that includes the statement, "SELECT a+1 as b":

```
Line 1:  func addOneCopyToColumn (source, destination string)
           func(Row) {
Line 2:    return
Line 3:      func(row Row) {
Line 4:        row.put(destination, row.get(source) + 1)
Line 5:      }
Line 6:    }
Line 7:  }
```

In this example, lines 1 and 2 may be executed by code generation platform 230 during AST identification, e.g., by a parser, compiler, and/or the like, which calls the addOneCopyToColumn function (e.g., a predefined function of the compiler) to obtain a closure (e.g., the closure of lines 3 and 4). Execution of lines 1 and 2 binds the source and destination variables to values of "a" and "b" respectively (e.g., "a" as source and "b" as destination, identified during AST identification), and code generation platform 230 obtains the closure. During execution of the code, code generation platform 230 may call the closure function (e.g., the function returned in lines 3 and 4) for every row in a database. The row parameter of the returned function, "func," is unbound during the closure creation, and code generation platform 230 provides the row during execution. In addition, the statement included in line 4 may be precompiled as a result of closure generation, e.g., line 4 may be precompiled in machine language. The resulting execution of the closures may cause operations to be performed in the same manner as if a developer were to pass the function the row and perform the operation of line 4, compile that code, and run it. However, by using closures, the efficiency of performing the operations may be greatly increased.

A traditional compiler may generate the Go code above in a file, which may then be compiled by a Go compiler to generate an executable binary file that could be executed by a computing device. Code generation platform 230, however, may generate, from the example SQL statement, the following Go closures in precompiled form:

```
func add(left func( ) int, right func( )int) func( ) int {
    return func( ) int {
        return left( ) + right( )
    }
}
func (row *Row) store(dest string. value interface{ }) func ( ){
    return func( ) {
        -- code to store value in column b
    }
}
operation := row.put("b", add(left, right)( ))
operation( )
```

In the above example, the "add" function takes in two closure functions "left" and "right," and each function is expected to return an integer value. The "add" function then adds the integer values and returns the result. The "add" closure is passed to the "store" closure, which stores the result of the addition into column b. The above example includes nested closures and, by using precompiled code, the closures may be capable of being executed by code generation platform 230. By executing the precompiled closures, code generation platform 230 may perform the operations specified by the initial SQL statement without the need to interpret the AST during execution of the precompiled closures and without the need to generate any intermediate files. Other precompiled closures may be predefined for use with other types of statements that include other operands, which code generation platform 230 may use to generate one or more closures for later execution.

In some implementations, code generation platform 230 may obtain the closure by submitting the AST to another device that is capable of providing one or more closures, such as a another code generation platform 230 or device that includes or otherwise has access to a database of closures associated with various statements and/or constructs. For example, the database may include a predefined closure for addition, a predefined closure for comparators, a predefined closure for Boolean operations, and/or the like. In some implementations, code generation platform 230, or the other device that provides closures, may use a template closure that can be populated with the actual values from the AST. For example, a template closure for addition may be used for addition operations identified in an AST, and the child nodes of the addition operand may be used to fill in the template closure.

In some implementations, the closures may be nested, e.g., in a manner designed to enable the repeated execution of the same code multiple times. By using nested closures, operations that are typically repeated multiple times may be performed only once, which may greatly enhance the speed of executing operations specified by the source code, thereby conserving processing resources. For example, an SQL operation may map the name of a column to an index of an array, and this operation may be performed once for each of many tables. Without nesting closures, example Go code may be as follows:

```
func (row *Row) store(dest string, value interface{ }) {
    index := row.cols[dest]
    row.arr[index] = value
}
```

In the above example, the "store" function may be used to look up the index to the array "row.arr" in the "cols" map every time a value is to be stored in the array. By using nested closures, code generation platform 230 may obtain the same results in a more resource efficient manner. Example Go code for nesting closures is shown below:

```
func (row *Row) rowSetter(dest string) func(value interface{ }) {
    index := row.cols[dest]
    return func(value interface{ }) {
        row.arr[index] = value
    }
}
aSetter := colSetter("a")
aSetter(5)
```

In the above example, the "rowSetter" function is called once for the table. The "rowSetter" function is used to look up the index for the column and returns a closure that stores the value in the row using the index value that was obtained when the closure was created. In this way, code generation platform 230 may use nested closures to significantly reduce the computational resources used to perform repeated operations (e.g., the SQL operation to map the name of a column to an index of an array).

In various implementations, the programming language used for the closure(s) may differ. For example, a closure may be in the same language as the source code, or may be in a different language. As a particular example, the source code may be in SQL language and the closure may be in Go language. In some implementations, code generation platform 230 may create a closure for anything in the AST that a closure can be created for (e.g., such that there will be no source code left for which a computing device that executes the operations specified by the source code will need to traverse the AST).

In this way, code generation platform 230 may identify a closure based on the AST, enabling code generation platform 230 to perform an action based on the closure.

As further shown in FIG. 4, process 400 may include performing an action based on the closure (block 440). For example, code generation platform 230 may perform an action (e.g., using computing resource 235, processor 320, and/or the like) based on the closure. In some implementations, code generation platform 230 may perform an action that includes executing the closure. For example, code generation platform 230 may perform one or more operations that were originally specified by the source code and which were subsequently stored, as a precompiled closure, in memory of code generation platform 230. As noted above, the closures may include precompiled code, e.g., code that is ready for execution by code generation platform 230. During execution, code generation platform 230 may execute the closures without having to traverse the AST during execution.

In some implementations, code generation platform 230 may send executable code to another device for execution, such as a separate computing resource 235. For example, as part of a cloud computing environment, the computing resource 235 responsible for identifying the closure may be separate from the computing resource 235 responsible for executing the closure. Accordingly, code generation platform 230 may use multiple computing resources 235 to execute the closure, store the closure, provide the closure to another device, and/or the like. As noted above, whichever device executes the closure may be capable of executing the closure without requiring compilation of the closure or AST traversal during execution.

As a specific example, code generation platform 230 may be receiving source code from many source devices 210 that are using cloud computing environment 240 to perform the operations included in the source code, such as the execution of multiple SQL scripts. In this example, code generation platform 230 may generate precompiled closures for the pieces of source code, and the precompiled closures may be executed by code generation platform 230 and/or transmitted to other devices in cloud computing environment 240 for execution.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
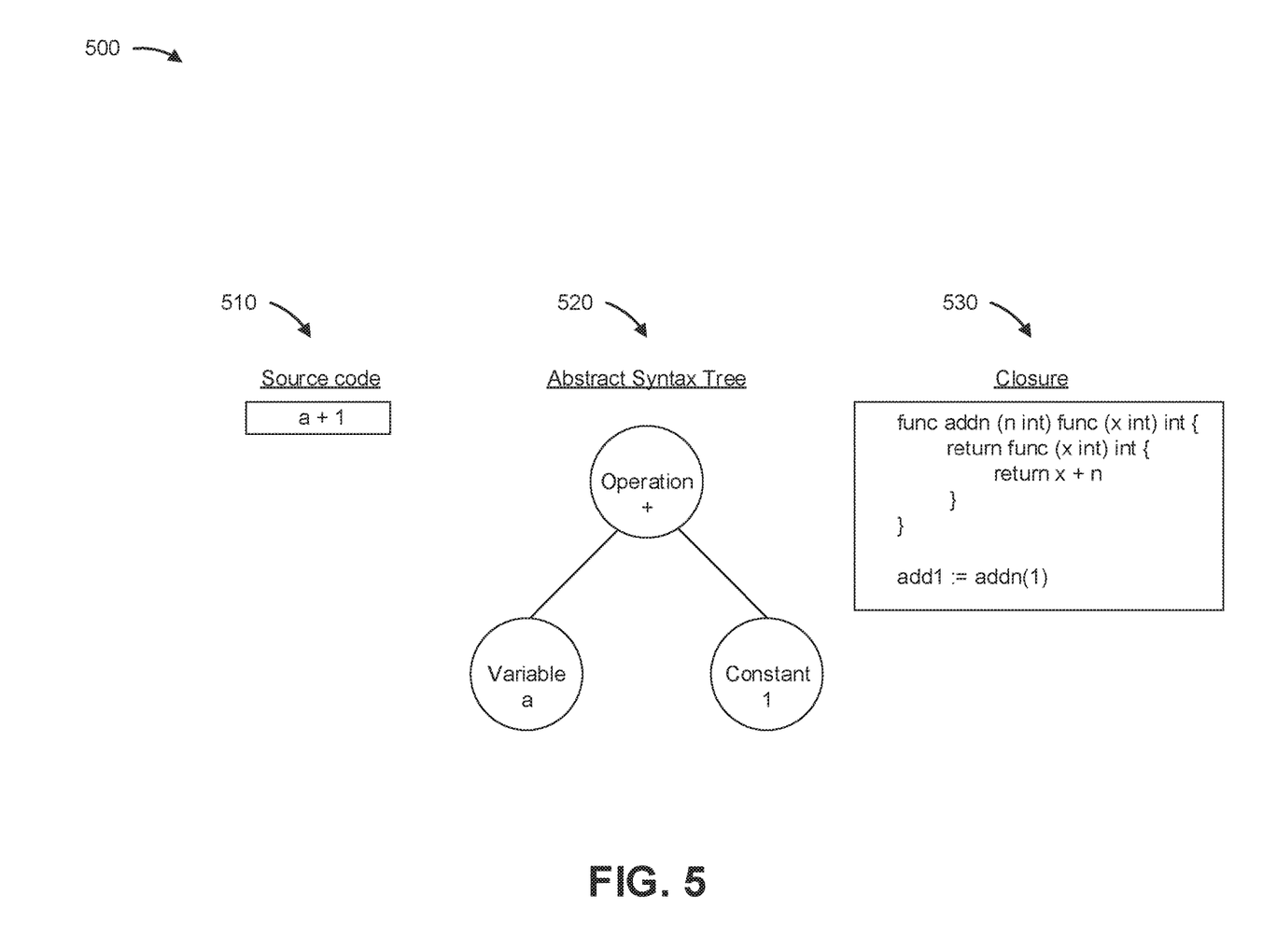
FIG. 5 is a diagram of an example implementation relating to the example process shown in FIG. 4.

FIG. 5 is a diagram of an example implementation 500 relating to example process 400 shown in FIG. 4. For example, FIG. 5 depicts an example portion of source code 510, an AST 520, and a closure 530.

As shown in FIG. 5, the source code 510 includes an expression, "a+1," which specifies an operation, e.g., the addition of a variable, "a," and a constant, "1." The AST 520 associated with the source code 510 is also depicted in FIG. 5. For example, the AST 520 includes a root node that includes the "+" operand and two children, or leaf nodes, the variable, "a," and the constant, "1." As further shown in FIG. 5, the example closure 530 created based on the AST includes a closure for addition. As noted above, the closure for addition may be precompiled, and may be formed from a template closure for addition (e.g., filling in, in this example, a variable and a constant).

By generating executable code (e.g., a precompiled closure) that does not require traversal of an AST, code generation platform 230 may provide executable code that can be executed much faster than traditional interpreted code (e.g., because traversal of an AST is not required), thereby conserving processing resources. In addition, the executable code may be generated in a way that does not require compilation of the executable code into a separate intermediary or binary file (e.g., instead, storing the executable closures in memory of the device to execute the closures), obviating the need to store any intermediary files by the device(s) executing the executable code. Due to the foregoing, execution of source code by converting source code into executable code that includes closures may be more efficient than traditional code execution methods, conserving computing resources such as processing resources, storage resources, and/or the like. For example, when used in a large scale cloud computing environment (e.g., where code generation platform 230 is implemented in multiple services across a cloud deployment), significant computing and developer resources may be conserved. In addition, code generation platform 230 may be able to produce executable code that is in the same programming language as the source code or is in a different programming language from the source code, which may enable the operations specified by a wide variety of source code to be executed by computing devices that may only support certain programming languages. When implemented on a large scale, such as in an implementation where computing devices are used to execute many hundreds, thousands, millions, etc. of instructions, the use of the code generation platform 230 may conserve a significant amount of computing resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
   identifying, by one or more devices, source code;
   identifying, by the one or more devices, an operand in the source code;
   identifying, by the one or more devices, a template closure based on the operand;
   identifying, by the one or more devices, a programming language of the source code; and
   generating, by one or more devices and based on the template closure and the programming language of the source code, executable code that does not require compilation of the executable code into a separate intermediary or binary file.

2. The method of claim 1, wherein the executable code is in the programming language of the source code.

3. The method of claim 1,
   wherein the programming language of the source code is a first programming language, and
   wherein the executable code is in a second programming language, and
   wherein the second programming language is different from the first programming language.

4. The method of claim 1, wherein the executable code is a precompiled closure.

5. The method of claim 1, further comprising:
storing the executable code in a memory of a device, of the one or more devices, to execute one or more closures of the executable code.

6. The method of claim 1, wherein the executable code is generated using a code generation platform that is implemented in multiple services across a cloud deployment.

7. A non-transitory computer-readable medium storing instructions, the instructions comprising:
one or more instructions that, when executed by one or more processors, cause the one or more processors to:
identify source code;
identify an operand in the source code;
identify a template closure based on the operand;
identify a programming language of the source code; and
generate, by one or more devices and based on the template closure and the programming language of the source code, executable code that does not require compilation of the executable code into a separate intermediary or binary file.

8. A system, comprising:
one or more memories; and
one or more processors communicatively coupled to the one or more memories, configured to:
identify source code;
identify an operand in the source code;
identify a template closure based on the operand;
identify a programming language of the source code; and
generate, by one or more devices and based on the template closure and the programming language of the source code, executable code that does not require compilation of the executable code into a separate intermediary or binary file.

9. The system of claim 8, wherein the executable code is in the programming language of the source code.

10. The system of claim 8,
wherein the programming language of the source code is a first programming language, and
wherein the executable code is in a second programming language, and
wherein the second programming language is different from the first programming language.

11. The system of claim 8, wherein the executable code is a precompiled closure.

12. The system of claim 8, wherein the one or more processors are further configured to:
store the executable code in the one or more memories to execute one or more closures of the executable code.

13. The system of claim 8, wherein the executable code is generated using a code generation platform that is implemented in multiple services across a cloud deployment.

14. The method of claim 1, wherein identifying the operand comprises:
identifying an abstract syntax tree based on the source code, and
identifying the operand based on the abstract syntax tree.

15. The non-transitory computer-readable medium of claim 7, wherein the one or more instructions to identify the operand cause the one or more processors to:
identify an abstract syntax tree based on the source code, and
identify the operand based on the abstract syntax tree.

16. The non-transitory computer-readable medium of claim 15, wherein the executable code is in the programming language of the source code.

17. The non-transitory computer-readable medium of claim 15, wherein the executable code is a precompiled closure.

18. The non-transitory computer-readable medium of claim 15, wherein the one or more instructions, when executed by the one or more processors, further cause the one or more processors to:
store the executable code in a memory to execute one or more closures of the executable code.

19. The non-transitory computer-readable medium of claim 15, wherein the executable code is generated using a code generation platform that is implemented in multiple services across a cloud deployment.

20. The system of claim 8, wherein, when identifying the operand, the one or more processors are configured to:
identify an abstract syntax tree based on the source code, and
identify the operand based on the abstract syntax tree.

* * * * *